Patented May 7, 1940

2,199,577

UNITED STATES PATENT OFFICE 2,199,577

TRIARYLMETHANE DYESTUFFS

Karl Schmidt, Cologne-Mulheim, Germany, assignor to General Aniline & Film Corporation, a corporation of Delaware No Drawing. Application October 20, 1938, Serial No. 236,003. In Germany November 6, 1937

5 Claims. (Cl. 260—392)

The present invention relates to new triarylmethane dyestuffs and to a method of preparing the same, more particularly it relates to acid violet triamino-triarylmethane dyestuffs of the general formula

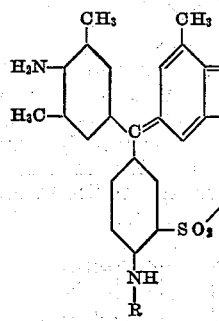

In this formula R stands for a phenol radical which is substituted in the nucleus by solubilizing groups such as sulfonic acid and/or carboxylic acid groups.

My new dyestuffs are obtained by reacting triarylmethane dyestuffs which contain twice in the molecule the residue of vic.m-xylidine and further in p-position to the carbinol carbon atom exchangeable groups such as halogen, the alkoxy, sulphonic acid or nitro group, with aminophenols or substitution products thereof. The components are to be selected in such a manner that the triaminotriarylmethane dyestuffs obtained contain at least two solubilizing groups such as the carboxylic acid group or the sulfonic acid group. These groups may also be introduced after the formation of the dyestuffs.

The new dyestuffs are dark, water-soluble powders. They are especially suited for dyeing wool and silk and are distinguished by a good leveling power. Above all the new dyestuffs showing an extraordinary clearness of the shades are distinguished by an unexpected fastness to light. While the violet triarylmethane dyestuffs which had become known until now had a fastness to light of about 1, the new dyestuffs show a fastness to light of 3 to 5.

The invention is further illustrated but not limited by the following examples, in which the quantities are stated in parts by weight:

Example 1

20 parts of the dyestuff of the following constitution

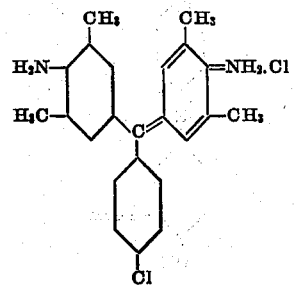

are heated to about 100° C. with 50 parts of p-phenetidine until the reaction is complete. By stirring with dilute hydrochloric acid the excess p-phenetidine is eliminated and the isolated dyestuff is sulfonated until it becomes soluble in water. The dyestuff corresponds in its free state to the formula

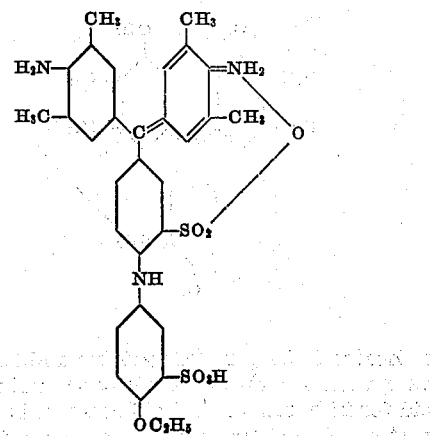

and dyes wool and silk in reddish violet shades with a fastness to light of 3.

Example 2

15 parts of the dyestuffs of the following constitution

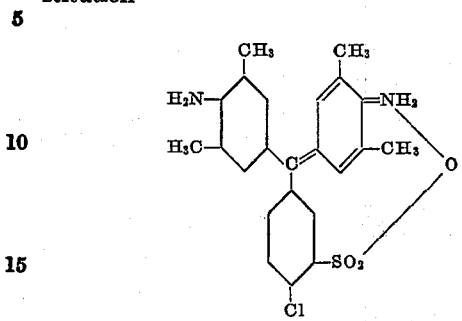

are heated in 50 parts of pyridine and 10 parts of water with 6.5 parts of 4-aminophenol-2-sulfonic acid for 12 hours on the boiling water bath with stirring. After cooling the separated dyestuff is sucked off and washed with dilute sodium chloride solution. The dyestuff corresponds in the free state to the formula

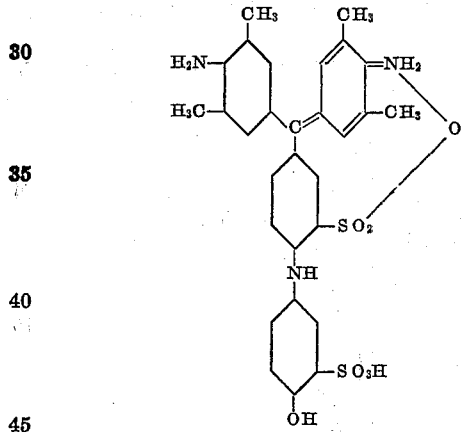

and dyes wool and silk reddish violet shades with a fastness to light of 3 and is distinguished by a good leveling power.

Example 3

10 parts of the dyestuff of the following constitution

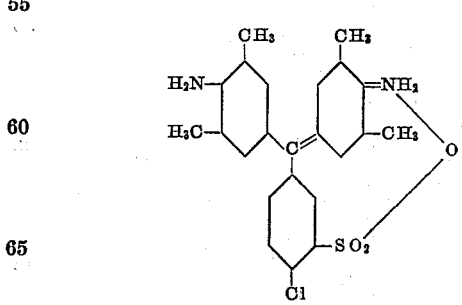

are heated in 50 parts of pyridine and 10 parts of water with 4 parts of 2-hydroxy-3-aminobenzoic acid for 24 hours on the boiling water bath. The dyestuff which separates in well shaped crystals is sucked off, washed with sodium chloride solution and dried. The dyestuff corresponds in its free state to the formula

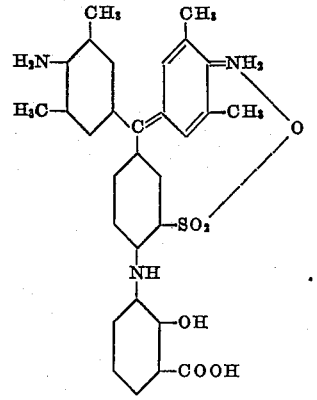

and dyes wool and silk bluish violet shades with a fastness to light of 4.

Example 4

6 parts of the dyestuff of the following constitution

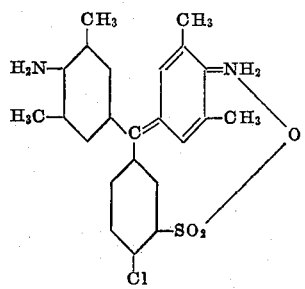

are heated in 30 parts of pyridine and 15 parts of water with 4 parts of 3-sulfo-5-amino-2-hydroxybenzoic acid for 15 hours to 95–100° C. Thereupon the mixture is given into 300 parts of hot water, the dyestuff is sucked off and dried. It corresponds in its free state to the formula

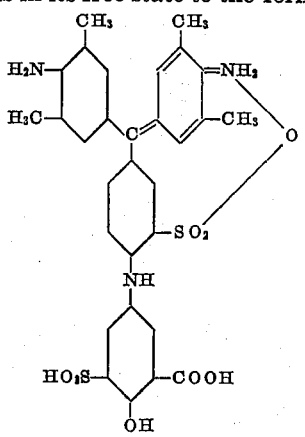

and dyes wool and silk bluish violet shades with a fastness to light of 4 to 5.

Example 5

15 parts of the dyestuff of the following constitution:

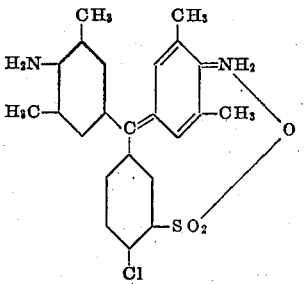

are heated in 75 parts of pyridine and 15 parts of water with 6.3 parts of 5-amino-2-hydroxybenzoic acid for 14 hours on the boiling water bath. After cooling the golden yellow crystals of the separated dyestuff are sucked off, the pyridine is washed off with water containing hydrochloric acid and the dyestuff is dried. It corresponds in its free state to the formula

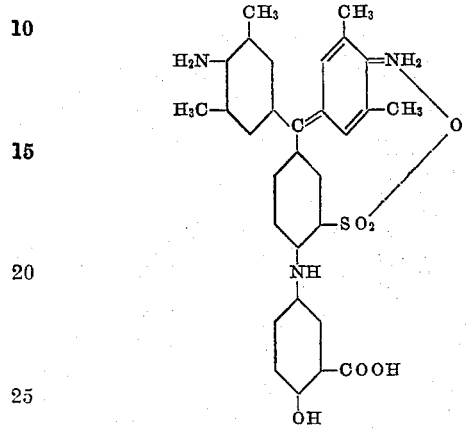

and dyes wool and silk in very clear violet shades with a fastness to light of 4.

The degree of fastness to light has been determined according to "Verfahren, Normen und Typen", 7th edition, 1935, page 5, published by Verlag Chemie G. m. b. H., Berlin W. 35.

I claim:

1. As new products acid violet triaminotriarylmethane dyestuffs of the general formula

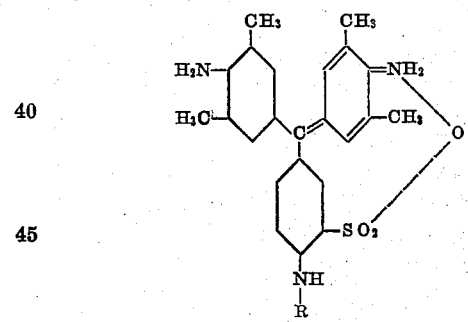

wherein R stands for a phenol radical bearing substituents selected from the group consisting of —COOH and —SO₃H, dyeing wool and silk very clear shades of very good fastness to light.

2. As new products acid violet triaminotriarylmethane dyestuffs of the general formula

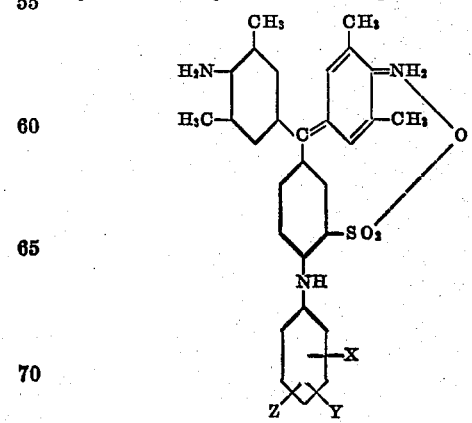

wherein X stands for one of the group consisting of —OH and alkoxy, Y stands for one of the group consisting of —COOH and SO₃H and Z stands for one of the group consisting of hydrogen and —COOH, dyeing wool and silk very clear shades of very good fastness to light.

3. As new product the triaminotriarylmethane dyestuff which corresponds in its free state to the following formula

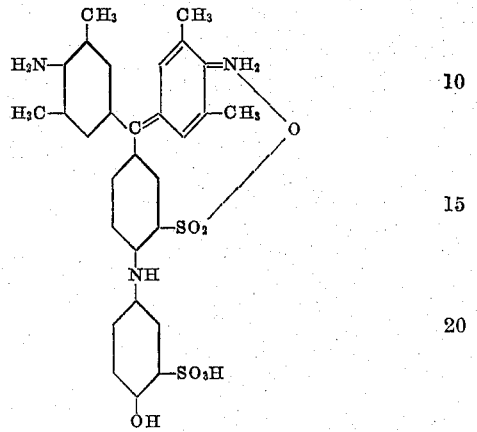

dyeing wool and silk very clear reddish violet shades with a fastness to light of 3.

4. As new product the triaminotriarylmethane dyestuff which corresponds in its free state to the following formula

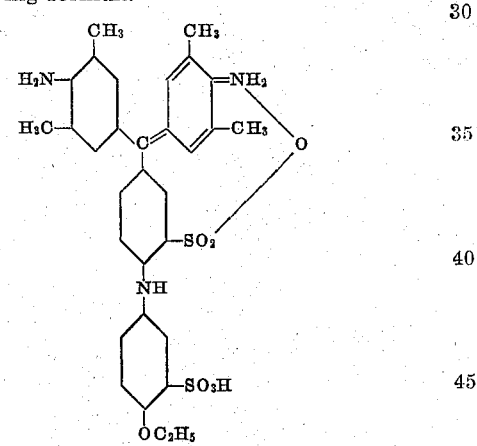

dyeing wool and silk very clear reddish violet shades with a fastness to light of 3.

5. As new product the triaminotriarylmethane dyestuff which corresponds in its free state to the following formula

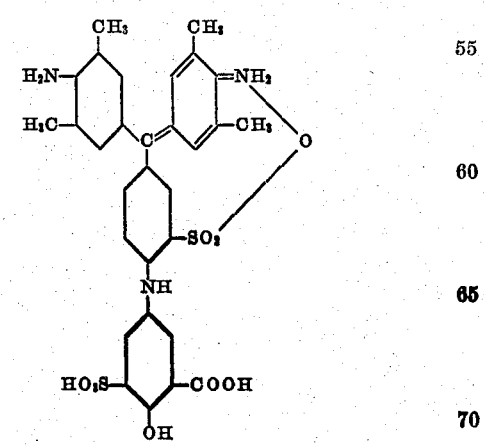

dyeing wool and silk very clear bluish violet shades with a fastness to light of 4–5.

KARL SCHMIDT.